United States Patent [19]

Hickok

[11] Patent Number: 4,691,245
[45] Date of Patent: Sep. 1, 1987

[54] METHOD AND APPARATUS FOR COMBINING TWO COLOR VIDEO SIGNALS

[75] Inventor: William K. Hickok, Rochester, N.Y.

[73] Assignee: Eastman Kodak Company, Rochester, N.Y.

[21] Appl. No.: 677,270

[22] Filed: Dec. 3, 1984

[51] Int. Cl.⁴ .................... H04N 9/80; H04N 11/06; H04N 5/782
[52] U.S. Cl. ..................................... 358/310; 358/12; 358/142
[58] Field of Search .................. 358/11, 12, 14, 15, 358/30, 31, 140, 141, 142, 310, 312, 320, 335; 360/10.1, 10.3, 18

[56] References Cited

U.S. PATENT DOCUMENTS

| Re. 29,999 | 5/1979 | Hirota | 360/84 X |
|---|---|---|---|
| 4,027,333 | 5/1977 | Kaiser et al. | 358/146 |
| 4,084,181 | 4/1978 | Mita et al. | 358/12 |
| 4,127,865 | 11/1978 | Poetsch | 358/12 |
| 4,163,247 | 7/1979 | Bock et al. | 358/12 |
| 4,167,028 | 9/1979 | Tobey | 360/72.2 |
| 4,188,638 | 2/1980 | de Haan | 358/11 X |
| 4,232,329 | 11/1980 | Horak et al. | 360/22 X |
| 4,287,528 | 9/1981 | Levy | 358/142 X |
| 4,300,161 | 11/1981 | Haskell | 358/142 |
| 4,335,393 | 6/1982 | Pearson | 358/12 X |
| 4,386,424 | 5/1983 | Christiansen | 358/142 X |
| 4,429,334 | 1/1984 | Hashimoto et al. | 358/310 |
| 4,488,182 | 12/1984 | Takahashi et al. | 358/310 |
| 4,521,803 | 6/1985 | Gittinger | 358/12 |
| 4,530,004 | 7/1985 | Achida et al. | 358/31 X |
| 4,533,960 | 8/1985 | Tiemann et al. | 358/12 X |
| 4,568,967 | 2/1986 | Freyberger et al. | 358/30 X |

OTHER PUBLICATIONS

Derwent EP 24744, 3-11-81, Japanese Abstract C4342 D/12 EP-24-744.
"Cost Effective Bandwidth Compression Technique for Increasing CATV System Channel Capacity" (see U.S. Ser. No. 677,270; p. 2, line 12 et seq.).
Letter dated 6/14/82 from Robert Bosch, Japan, entitled "Timeplex—A Serial Colour Encoding System for Home Video Recorders".
Report dated 1/20/83—Thomas-Brandt Consumer R&D Labs; "A Status Report on the Development of Timeplex-System for the 8 mm VTR".

Primary Examiner—Raymond F. Cardillo
Assistant Examiner—Wayne R. Young
Attorney, Agent, or Firm—William F. Noval

[57] ABSTRACT

Method and apparatus for the processing of color video signals in which the two fields of a color video frame are compressed into a single field without appreciable loss of picture resolution and without image disturbance and degradation. The compressed signal may be recorded on a single track of a VCR and played back in a still-frame mode without picture jitter, color loss, or image degradation. According to the invention, first and second color video signals of a predetermined time period (such as a field period) are compressed into a time-division-multiplexed (TDM) signal of a single time period. The luminance components of the first and second signals are summed to produce a sum luminance signal and subtracted to produce a difference luminance signal, the sum signal having a greater bandwidth than the difference signal. A chrominance signal is produced which is a function of the chrominance components of the first and second signals. The luminance signals and chrominance signal are compressed and arranged sequentially to form a TDM signal of a single time period.

12 Claims, 6 Drawing Figures

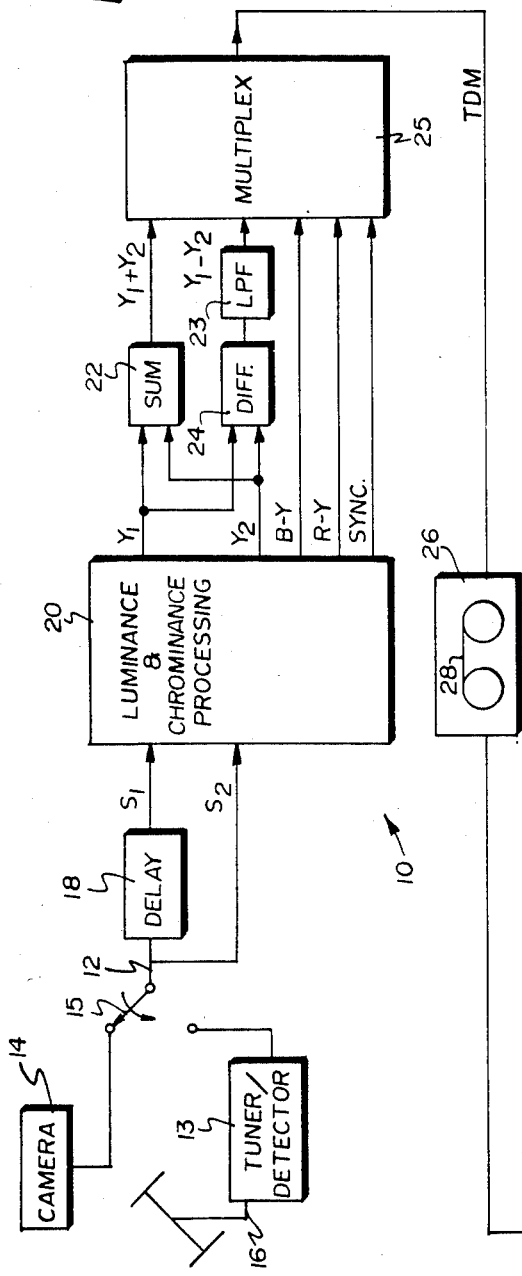
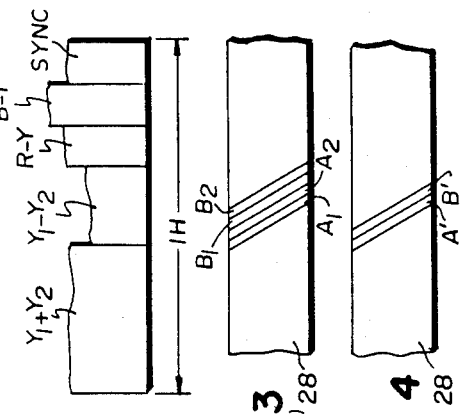
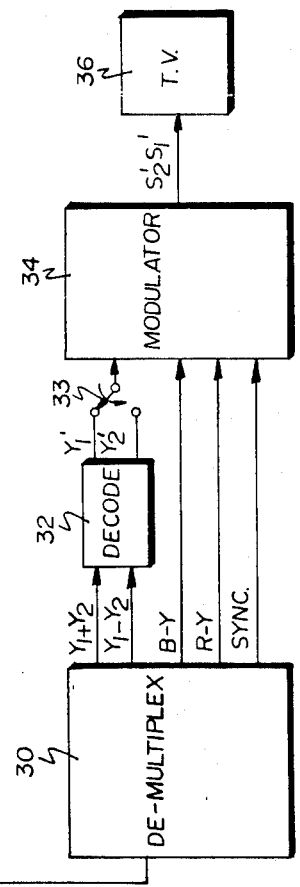
FIG. 1
FIG. 2
FIG. 3 (PRIOR ART)
FIG. 4

METHOD AND APPARATUS FOR COMBINING TWO COLOR VIDEO SIGNALS

BACKGROUND OF THE INVENTION

This invention relates in general to processing of color video signals. In particular, this invention relates to method and apparatus for combining first and second color video signals into a single color video signal for recording or transmission in a reduced time period with minimal loss of signal information.

A standard color video signal such as the composite NTSC color television signal includes amplitude modulated luminance and quadrature related chrominance components which are frequency interleaved. The luminance component is transmitted at a full frequency bandwidth i.e. 4.2 Mhz., whereas the chrominance components are reduced in bandwidth. In the NTSC system approximately thirty frames of color information are transmitted each second with each frame comprising two interlaced fields. In order to record a composite television signal for home use, commercially available video cassette recorders (VCRs) utilize rotating magnetic heads to lay down oblique tracks on moving magnetic tape. A single video field is recorded on a single track length so that two tracks are required to record a complete video frame. If the frame is played back in a still frame mode, the playback heads will tend to bridge adjacent tracks of a frame causing annoying noise signals and jitter in the displayed picture. Moreover, with the trend towards more compact VCR's and the combination of the recorder and the camera into a lightweight, easy to handle, hand-held unit, the need exists to record the video signal on less and less recording tape. Thus, in U.S. Pat. No. Re. 29,999 entitled SYSTEM AND APPARATUS FOR RECORDING AND REPRODUCING TELEVISION VIDEO SIGNALS, reissued May 15, 1979, by A. Hirota there is disclosed a system for reducing by one-half the amount of magnetic tape required to record and play back a color video frame signal. As disclosed, only one of the two fields of each frame of a video signal is recorded on tape transported at one-half of the conventional speed. On playback, the field is played back twice in interlaced fashion to reproduce the video frame. This system results in a loss of vertical resolution since only half of the scanned lines of a video frame are reproduced.

It has also been proposed to transmit two video signals over a single cable channel by bandwidth compression techniques in a paper entitled "Cost Effective Bandwidth Compression Techniques for Increasing CATV System Channel Capacities" by R. L. Hess and H. C. Willard, of General Electric Co., Portsmouth, Va. As disclosed, the luminance components in adjacent scan lines are added to produce a signal which is transmitted at maximum bandwidth, and are also subtracted to produce another signal which is transmitted at reduced bandwidth. The sum and difference luminance signals are modulated in quadrature on an RF carrier. The two chrominance components are bandwidth limited and averaged for the two lines and modulated in quadrature on a color subcarrier frequency. The luminance and chrominance quadrature signals are sent within the time period of a single line so that the time period of a second line may be used to transmit a second different video signal. Although this system reduces the transmission time of a video frame signal, recording and playback may produce cross-modulation between the quadrature luminance signals resulting in crawling patterns in the edges of objects, and objectionable disturbances in picture reproduction. The quadrature chrominance signal may be subjected to time base errors in recording and playback which cause color bands in the picture.

Thus, there exists a need for video signal processing techniques which will permit the recording or transmission of a greater amount of video information on a given amount of record material or in a reduced transmission channel without loss of picture resolution and color fidelity and without the production of picture disturbances and image degradation. There is also a need in consumer VCRs to provide the ability to play back a single video frame in a still mode without image disturbances and degradation.

SUMMARY OF THE INVENTION

According to the present invention, there is provided method and apparatus for the processing of color video signals in which two fields of a color frame are compressed into a single field without appreciable loss of picture resolution and without image disturbance and degradation. Moreover, a compressed field signal may be recorded on a single track by a helical scan VCR or a magnetic disk still camera so that upon playback in a still-frame mode, the displayed picture does not exhibit jitter, color loss and image degradation. According to the present invention, first and second color video signals of a predetermined time period (such as a field period) are compressed into a signal having a single predetermined time period. The luminance components of the first and second video signals are summed to produce a sum luminance signal which is a function of said luminance signals. A difference luminance signal is also produced which is a function of the difference of the luminance components of the first and second signals. The bandwidth of the sum signal is greater than the bandwidth of the difference signal. In addition, a chrominance signal is produced which is a function of the chrominance components of the first and second signals. The sum and difference luminance signals as well as the chrominance signal are compressed and sequentially arranged to form a time division multiplexed signal having a single predetermined time period. In a preferred embodiment adjacent lines of first and second fields of a video frame are combined to produce a time division multiplex signal of a single line. Corresponding lines of the two fields are sequentially compressed to form a single field TDM signal which represents the two fields of a video frame. This compressed field signal may be recorded on a single track of magnetic tape or disk.

The invention and its features and advantages will be set forth and become more apparent in the detailed description of the preferred embodiment presented below.

BRIEF DESCRIPTION OF THE DRAWINGS

In the detailed description of the preferred embodiment of the invention presented below, reference is made to the accompanying drawings in which like elements are numbered with like numbers.

FIG. 1 is a block diagram of recorder/playback apparatus incorporating the video signal processing technique of the present invention;

FIG. 2 is a signal waveform diagram showing a single horizontal line of a compressed two-line video signal;

FIGS. 3 and 4 are segments of magnetic tape showing obliquely recorded tracks; and FIGS. 5A and 5B show a more detailed schematic diagram of the apparatus of FIG. 1.

DESCRIPTION OF THE PREFERRED EMBODIMFNT

Referring now to FIG. 1, there is shown video recorder/playback apparatus incorporating the video signal processing method and apparatus of the present invention. As shown, video recorder/playback apparatus 10 receives a composite video signal at input terminal 12 from camera 14 or from a transmission source such as television antenna 16. In the latter case, tuner and detector 13 selects a transmitted RF signal and produces a video signal S. The composite video signal may be in a known format such as in the NTSC video signal used in the United States and Japan, in the PAL video signal used in most European countries, or in the SECAM video signal used in France. For illustrative purposes in the following description, the NTSC composite color video signal will be described but it will be understood that other known standard as well as non-standard signals may also be used in the present invention. In the NTSC system, approximately thirty color image frames are displayed each second, each frame including 525 horizontal lines which are interlaced in two fields. The composite color video signal is transmitted in a channel having a bandwidth of 6 Mhz, with a luminance or black and white component modulated on a picture carrier which is 1.25 Mhz from the lowest frequency in the television channel. The luminance component Y includes red, green, and blue information in a predetermined ratio given by the following formula: $Y=0.30R+0.59G+0.11B$. The chrominance component includes an I component ($I=-0.27(B-Y)+0.74(R-Y)$) and a Q component ($Q=0.41(B-Y)+0.48(R-Y)$) which are multiplexed in quadrature on a chrominance subcarrier of 3.58 Mhz. The luminance and I and Q chrominance signals have respective bandwidths of 4.2 Mhz, 1.3 Mhz, and 0.5 Mhz.

According to the video signal processing technique of the present invention, two time periods of video signal (e.g., field periods) are combined into a single time period in order to reduce the recorded or transmitted signal duration. For the purposes of the present description, it is assumed that a color video signal of two field periods (one frame) are compressed into a video signal of a single field period. Apparatus 10 includes a delay 18 of one field period, i.e. approximately 1/60 sec. so that two field signals $S_1$ and $S_2$ are simultaneously available for processing by luminance and chrominance processing circuit 20. Circuit 20 separates the luminance components $Y_1$ and $Y_2$ from signals $S_1$ and $S_2$ and demodulates chrominance components $B-Y$ and $R-Y$ from the chrominance signals $I_1$, $I_2$, and $Q_1$ and $Q_2$ of signals $S_1$ and $S_2$, respectively. The $B-Y$ and $R-Y$ signals may be averages of pairs of adjacent lines, may correspond to a single line, etc.

Luminance signals $Y_1$ and $Y_2$ are each respectively fed to the inputs of sum circuit 22 and difference circuit 24. Sum circuit 22 produces a signal $Y_1+Y_2$ which is a function of the sum of the luminance components $Y_1$ and $Y_2$ at full luminance bandwidth of 4.2 Mhz. On the other hand, difference circuit 24 produces a signal $Y_1-Y_2$ which is a function of the difference between luminance components $Y_1$ and $Y_2$. Low pass filter (LPF) 23 limits the $Y_1-Y_2$ signal bandwidth (such as to one-half the bandwidth of the sum signal or 2.1 Mhz). Sum luminance signal $Y_1+Y_2$, difference luminance signal $Y_1-Y_2$, chrominance signals $B-Y$ and $R-Y$ and a sync signal are supplied to multiplex circuit 25 which (as described in greater detail later) compresses the signals and arranges them in time sequential order to produce a time-division-multiplexed (TDM) signal (see FIG. 2).

The TDM signal is recorded on magnetic tape 28 by recorder/playback unit 26. As shown in FIG. 3, the two fields of a video frame A are normally recorded on two adjacent tracks $A_1$, $A_2$ of video tape 28. Similarly, the two fields of the next frame B are recorded on tracks $B_1$, $B_2$. According to the present invention, the compressed TDM signal of frame A is recorded on a single track A' (FIG. 4), the compressed TDM signal of frame B is recorded on track B', etc. Thus, the amount of tape required to record successive frames is reduced as compared to the standard recording method. This results in conservation of tape, and permits playback from a single track to eliminate noise bands and picture jitter which frequently result when playback is from two adjacent tracks.

Referring to FIG. 1, the playback signal is supplied to de-multiplex circuit 30. Circuit 30 (to be described later in greater detail) expands the component signals of the TDM signal and converts them to $Y_1+Y_2$, $Y_1-Y_2$, $B-Y$, $R-Y$, and sync signals which are supplied in parallel at the output of circuit 30.

The sum and difference luminance signals $Y_1+Y_2$, $Y_1-Y_2$ are supplied to decode circuit 32 which combines the two signals to produce field one luminance signal $Y'_1$ and field two luminance signal $Y'_2$. $Y'_1$ and $Y'_2$ have all of the luminance information of each original luminance signal in the 0-2.1 Mhz bandwidth and have the average luminance of both original signals in the 2.1 to 4.2 Mhz bandwidth. The $Y'_1$ and $Y'_2$ signals are sequentially applied to modulator 34 by switch 33. The $B-Y$, $R-Y$ and sync signals are also supplied to modulator circuit 34 which reconstructs standard NTSC color video field signals $S'_1$ and $S'_2$. These signals are supplied sequentially to a standard TV display 36 to produce an interlaced color picture frame.

Referring now to FIGS. 5A and 5B, there is shown in greater detail the apparatus of FIG. 1. As shown, camera 14 produces a standard NTSC color video signal and may be any camera or imager well known to those skilled in the art. Transmission source is depicted as a television antenna 16 and tuner/detector 13 but may be any other transmission source such as cable, or the like. In addition, a recorded source of material such as a video disc or video tape recorder may be used to provide the standard composite color video signal. Switch 15 is provided to switch between camera 14 and transmission source 16. Delay 18 may comprise any type of memory which provides a delay of the predetermined time period. According to the present invention the signals to be combined may comprise a field time period so that delay 18 has sufficient capacity to delay a signal a field period. In such case, switch 17 is switched every field period so that the first field of a color video frame is delayed by delay 18 a full field time period and switch 17 is switched to line 19 for the second field so that the two field signals $S_1$ and $S_2$ of a color video frame are supplied simultaneously to circuit 20. For the purposes of the present description, it is assumed delay 18 provides a full field delay so that successive adjacent lines of first and second fields of a color frame are combined into successive single line periods.

Luminance and chrominance processing circuit 20 includes luminance filters 38 and 42 for separating the luminance components respectively from signals $S_1$ and $S_2$ and chrominance filters 40 and 44 for separating the chrominance components respectively from signals $S_1$ and $S_2$. (The design of filters is well known to those skilled in the art and is explained, for example, in the text "The Art of Electronics", by Paul Horowitz and Winfield Hell, Cambridge University Press, Cambridge 1980, (hereinafter "Horowitz") at pages 29, 34 and pages 148-162. A comb filter for separating luminance and chrominance signals is explained in the text "Basic Television and Video Systems", Fifth Ed., by Bernard Grob, McGraw-Hill Book Comapny, New York, 1984 (hereinafter "Grob"), at pages 243-245). Chrominance signals $I_1 Q_1$ and $I_2 Q_2$ are supplied to chrominance processing circuit 46 which converts the quadrature chrominance signals $I_1$, $Q_1$ and $I_2$, $Q_2$ into averaged $B-Y$ and $R-Y$ signals. (Chrominance processing circuit 46 may, for example, be of the type explained in "Grob", pages 176-7 and shown in FIG. 8-11).

Circuit 20 also includes sync separator circuit 48 for separating the horizontal (and vertical) sync pulses from signals $S_1$ and $S_2$.

Luminance signals $Y_1$ and $Y_2$ from circuit 20 are supplied simultaneously to sum circuit 22 and difference circuit 24 to produce sum luminance signal $Y_1+Y_2$ and difference luminance signal $Y_1-Y_2$ which is bandwidth limited by LPF 23.

Multiplex circuit 25 is supplied sum luminance signal $Y_1+Y_2$, difference luminance signal $Y_1-Y_2$, chrominance signals $B-Y$ and $R-Y$ and the sync signal in parallel from circuits 20, 22 and 24. Multiplex circuit 25 includes a plurality of memories 54, 56, 58, 60, and 62 (which may, for example, be analog memories such as charge coupled devices (CCDs)) which store analog samples of the respective signals supplied to circuit 25. It will be understood, however, that these memories may also be digital memories in which case suitable analog to digital converters would be required to convert the analog signals to digital signals. (The organization and operation of suitable memories are well known to those skilled in the art and are explained, e.g., in "Horowitz", pages 521-529). In any event, the signals written into memories 54-62 are sampled at different frequencies, the sum luminance signal $Y_1+Y_2$ being written into memory 54 at frequency $f_1$; difference luminance signal $Y_1-Y_2$ being written into memory 56 at a frequency $f_2$, chrominance signals $B-Y$ and $R-Y$ being written into memories 58 and 60, respectively at a frequency $f_3$ and the sync signal being written into memory 62 at frequency $f_3$.

Frequencies $f_1$, $f_2$, $f_3$ are produced by signal generator circuit 64 which includes an $f_1$ oscillator 66; divide by two circuit 68 which produces frequency $f_2$; and divide by two circuit 70 which produces frequency $f_3$. These frequencies have the relationship $f_1=2f_2=4f_3$. If it is assumed that the sum luminance signal $Y_1+Y_2$ has a bandwidth of 4.2 Mhz, difference signal $Y_1-Y_2$ has a bandwidth of 2.1 Mhz and chrominance signal $B-Y$ and $R-Y$ have bandwidths of approximately 1 Mhz, then, according to the sampling theory, $f_1$ has a frequency of at least twice the bandwidth of $Y_1+Y_2$ or 8.4 Mhz.; $f_2$ has a frequency of twice the bandwidth of $Y_1-Y_2$ or 4.2 Mhz, and $f_3$ has a frequency of at least twice the bandwidth of $B-Y$, $R-Y$ or 2.1 Mhz. The sync signal is also sampled at $f_3$ or 2.1 Mhz in order to provide chrominance and sync signals having equally compressed time periods.

Signal generator 64 also includes oscillator 72 which produces a write sampling frequency $f_4$. To compress two adjacent lines of video information into a single line (FIG. 2), $f_4$ is chosen to be 18.9 Mhz. Write frequency $f_4$ is applied to each of memories 54, 56, 58, 60, and 62 in sequential order so that compressed $Y_1+Y_2$, $Y_1-Y_2$, $B-Y$, $R-Y$ and sync signals are read out sequentially as a time-division-multiplexed (TDM) signal. The TDM signal is supplied to magnetic tape record and playback unit 26. Unit 26 receives a videocassette having a length of video tape 28 which is transported between reels 66 and 68. Record/playback magnetic heads 64 and 70 are mounted on a drum (not shown) and lay down oblique recording tracks on tape 28 (see FIGS. 3, 4). It will be understood that other media may be used such as optical or magnetic disks to record and play back the TDM video signal.

When unit 26 is operated in the playback mode, heads 64, 70 traverse a single track on tape 28 to reproduce the color video frame TDM signal which is supplied to demultiplex circuit 30. Circuit 30 includes a plurality of memories 72, 74, 76, 78, and 80 (e.g., CCD memories) into which the time compressed TDM signals from tape 28 are written sequentially at frequency $f_4$. (The organization and operation of suitable memories are well known to those skilled in the art and are explained, e.g., in "Horowitz", pages 521-529). Thus, sum luminance signal $Y_1+Y_2$ is written into memory 72, difference luminance (The relation of $B-Y$ and $R-Y$ video signals to I and Q video signals is well known to those skilled in the art and is explained, e.g., in "Grob", pages 182-184. A suitable modulation circuit for modulating Y, I and Q video signals as a composite color video signal is well known to those skilled in the art and is explained, e.g., in "Grob" pages 170-172 and FIG. 8—8 at page 172.) signal $Y_1-Y_2$ is written into memory 74, chrominance signal $B-Y$ is written into memory 76, chrominance signal $R-Y$ is written into memory 78 and the sync signal is written into memory 80. In order to reconstruct the original composite video signals at their respective bandwidths the signal components are read out simultaneously in parallel. Thus, signal $Y_1+Y_2$ is read out of memory 73 at frequency $f_1$, signal $Y_1-Y_2$ is read out of memory 74 at frequency $f_2$, signals $B-Y$ and $R-Y$ and the sync signal are respectively read out of memories 76, 78, and 80 at frequency $f_3$.

Luminance signals $Y_1+Y_2$, $Y_1-Y_2$ are respectively supplied simultaneously to sum circuit 82 and difference circuit 84 of decode circuit 32 to produce first field luminance signal $Y'_1$ and second field luminance signal $Y'_2$. $Y'_1$ and $Y'_2$ duplicate the luminance information of the original luminance signals in the 0-2.1 Mhz bandwidth. In the 2.1 to 4.2 Mhz bandwidth, the luminance information in each field is a function of the average of the original luminance signals $Y_1$ and $Y_2$.

Chrominance signals $B-Y$ and $R-Y$ are supplied to modulating circuit 34 as well as luminance signals $Y'_1$ and $Y'_2$ (sequentially by switch 33) and the sync signals. Circuit 34 includes a chroma coding circuit 86 which receives $B-Y$ and $R-Y$ chrominance signals and converts them into NTSC chrominance signals $I'_1$, $Q'_1$, and $I'_2$, $Q'_2$. Circuit 34 also includes modulator circuit 88 which converts the luminance signals $Y'_1$ and $Y'_2$ and chrominance signals I'₁, Q'₁, and I'₂, Q'₂ and the sync signals into composite NTSC signals S'₁ and S'₂ at the output thereof. Signal S'₂ is delayed one time period with respect to signal S'₁ by delay circuit 90 and the composite NTSC video signal is applied to a TV display 36 in known field interlace manner to produce a television picture.

Although the circuits of FIGS. 1 and 5 have been described as processing NTSC type signals, it will be understood that these circuits may be modified in order to process PAL and SECAM composite color video signals. Moreover, the method and apparatus of the present invention may be used with component video signals which include separate chrominance and luminance components or with RGB video signals which include separate red (R), green (G), and blue (B) video signals. These component signals generally have greater bandwidth and may never be multiplexed together so that NTSC matrixing and dematrixing circuitry would be unnecessary. In addition, instead of recording the TDM signal on a single track on magnetic disc or tape, it could be recorded on two or more tracks.

The technique of the present invention while effecting compression of a video signal also provides a frequency response pattern which accords better with the human eye's response. Whereas the eye has a resolution frequency response which is circular (i.e. the same at any angle of frequency), the normal luminance video signal has a square frequency response with vertical resolution determined by the horizontal line frequency and vertical resolution set by electrical filters (e.g. 4.2 Mhz). According to the invention, the square frequency response pattern is modified to a cross shaped pattern which more closely agrees with the eye's circular response pattern.

Thus, it will be seen that the color video signal processing method and apparatus of the present invention has significant advantages. A major advantage is the compression of two time periods of a color video signal into a single time period for recording or transmission. This permits more signal to be either recorded or transmitted in the same time period as a single signal, without increasing the parameters of recording or transmission. Compression is effected without appreciable loss of picture resolution and without image disturbance and degradation. Another significant advantage of the present invention is that when the two fields of a color video frame are recorded on a single track of a recording device such as a tape or disc recorder, the playback transducer(s) moves over the same track in the still frame mode so that jitter and picture noise are eliminated.

The invention has been described in detail with particular reference to preferred embodiments thereof, but it will be understood that variations and modifications can be effected within the spirit and scope of the present invention.

What is claimed is:

1. A method of color video signal processing comprising:
   simultaneously providing first and second video signals which are adjacent in a frame, each of which has unmodulated luminance and chrominance components and has a predetermined time period;
   producing a sum luminance signal which is a function of the sum of said luminance components of said first and second signals;
   producing a difference luminance signal which is a function of the difference of said luminance components of said first and second signals, the bandwidth of said sum signal being equal to the full bandwidth of said luminance components and being greater than the bandwidth of said difference signal;
   producing a chrominance signal which is a function of the chrominance components of said first and second signals; and
   selectively compressing said sum and difference luminance and said produced chrominance signal and arranging said compressed signals in a time sequential manner to form a time division multiplex (TDM) signal having a single predetermined time period.

2. The method of claim 1 wherein said predetermined period of each of said first and second video signals comprises a horizontal line period and wherein said first and second video signals respectively comprise adjacent lines of first and second fields of a video frame.

3. The method of claim 1 wherein said predetermined period of each of said first and second video signals comprises a field period and wherein said first and second video signals comprise first and second interlaced fields of a video frame.

4. The method of claim 1 including recording said TDM signal on a record medium.

5. Apparatus for processing color video signals comprising:
   means for simultaneously providing first and second video signals which are adjacent in a frame, each of which has unmodulated luminance and chrominance components and has a predetermined time period;
   means for producing a sum luminance signal which is a function of the sum of said luminance components of said first and second signals;
   means for producing a difference luminance signal which is a function of the difference of said luminance components of said first and second signals, the bandwidth of said sum signal being equal to the full bandwidth of said luminance components and being greater than the bandwidth of said difference signal;
   means for producing a chrominance signal which is a function of the chrominance components of said first and second signals; and
   means for selectively compressing said sum and difference luminance and said produced chrominance signal and arranging said compressed signals in a time sequential manner to form a time division multiplex (TDM) signal having a single predetermined time period.

6. The apparatus of claim 5 wherein said signal providing means provides first and second signals each of which having a line period.

7. The apparatus of claim 5 wherein said signal providing means provides first and second video signals of a field period, said first and second signals comprising interlaced fields of a video frame.

8. The apparatus of claim 5 including means for recording and playing back said TDM signal on and from a record medium.

9. The apparatus of claim 8 wherein said TDM signal is recorded on a single track of said record medium.

10. The apparatus of claim 9 wherein said record medium is magnetic tape.

11. The apparatus of claim 8 including means for expanding a TDM signal played back from said record medium and for demultiplexing said expanded signal into first and second luminance signals and chrominance signals, and means for modulating said first and second luminance signals and said chrominance signals into first and second color video signals of said predetermined time period.

12. Apparatus for combining first and second color video signals into a single color video signal with minimal loss of signal information, comprising:

means for concurrently providing first and second color video signals from adjacent horizontal lines in a video frame, each of said video signals having a line period and having unmodulated luminance and chrominance components, with each component having standard broadcast frequency bandwidth;

means for producing a sum luminance signal which is a function of the sum of said luminance components of said first and second signals, such that the frequency bandwidth of said sum luminance signal is equal to the bandwidth of said luminance components;

means for producing a difference luminance signal which is a function of the difference of said luminance components of said first and second signals, such that the frequency bandwidth of said difference luminance signal is less than the frequency bandwidth of said sum luminance signal;

means for producing an unmodulated combined chrominance signal which is a function of said unmodulated chrominance components of said first and second video signals, such that the frequency bandwidth of said combined chrominance signal is substantially less than the frequency bandwidth of said sum luminance signal and less than the frequency bandwidth of said difference luminance signal;

memory means for storing samples of each of said sum luminance, difference luminance and combined chrominance signals;

read in means for concurrently reading into said memory means (1) samples of said sum luminance signal at a frequency $f_1$ which is at least twice the frequency of the highest frequency signal of said sum luminance signal; (2) samples of said difference luminance signal at a frequency $f_2$ which is at least twice the frequency of said highest frequency of said difference luminance signal and (3) samples of said combined chrominance signal at a frequency $f_3$ which is at least twice the highest frequency of said combined chrominance signal; and means for sequentially reading out from said memory means, samples of said sum luminance signal, said difference luminance signal and said combined chrominance signal at a signal compression frequency $f_4$ which is substantially higher than said frequencies $f_1$, $f_2$, and $f_3$ and which is chosen to have a value such that a time-division-multiplex (TDM) signal is produced having a horizontal line period which has time sequential compressed signals.

* * * * *

UNITED STATES PATENT AND TRADEMARK OFFICE
CERTIFICATE OF CORRECTION

PATENT NO. : 4,691,245

DATED : September 1, 1987

INVENTOR(S) : William K. Hickok

It is certified that error appears in the above-identified patent and that said Letters Patent is hereby corrected as shown below:

The sheets of drawings consisting of Fig. 5A and Fig. 5B should be added as shown on the attached sheets.

Signed and Sealed this

Second Day of January, 1990

Attest:

JEFFREY M. SAMUELS

Attesting Officer     Acting Commissioner of Patents and Trademarks

UNITED STATES PATENT OFFICE
CERTIFICATE OF CORRECTION

PATENT NO. : 4,691,245

DATED : September 1, 1987

INVENTOR(S) : William K. Hickok

It is certified that error appears in the above-identified patent and that said Letters Patent is hereby corrected as shown below:

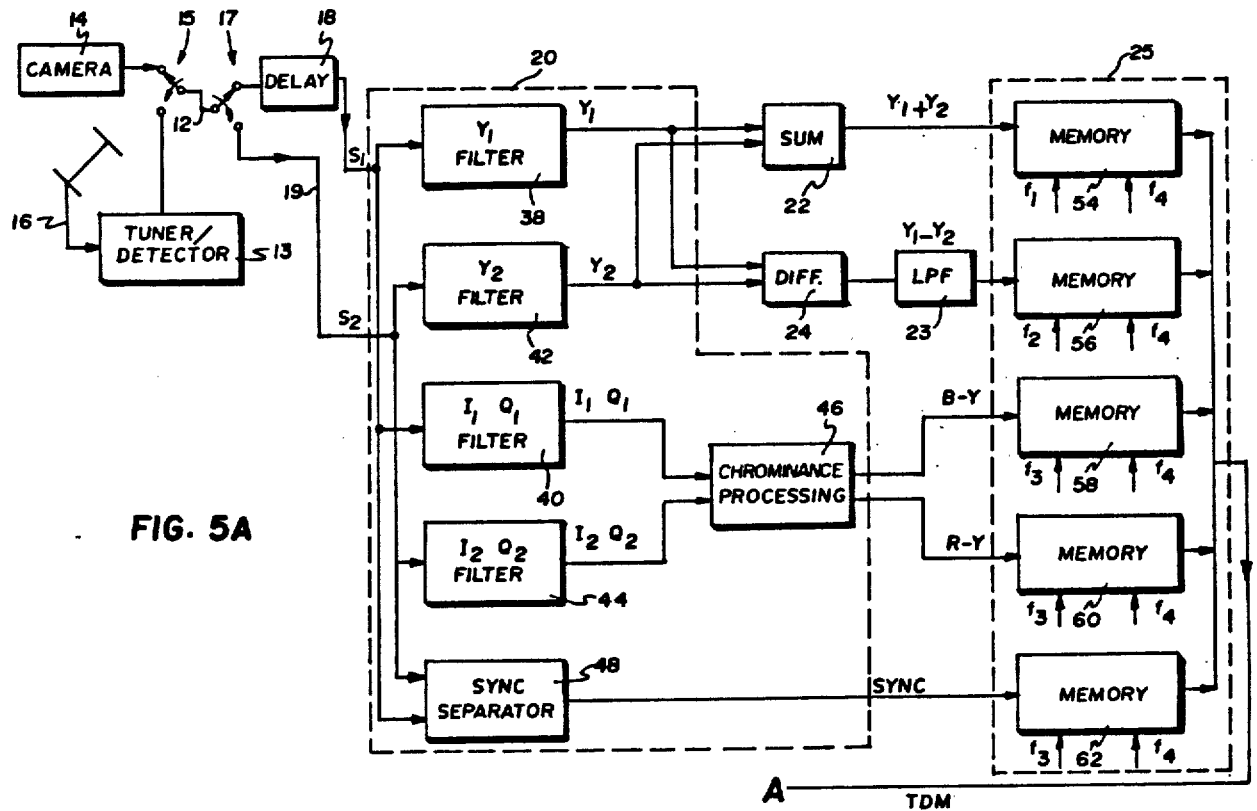

FIG. 5A

UNITED STATES PATENT OFFICE
CERTIFICATE OF CORRECTION

PATENT NO. : 4,691,245

DATED : September 1, 1987

INVENTOR(S) : William K. Hickok

It is certified that error appears in the above-identified patent and that said Letters Patent is hereby corrected as shown below:

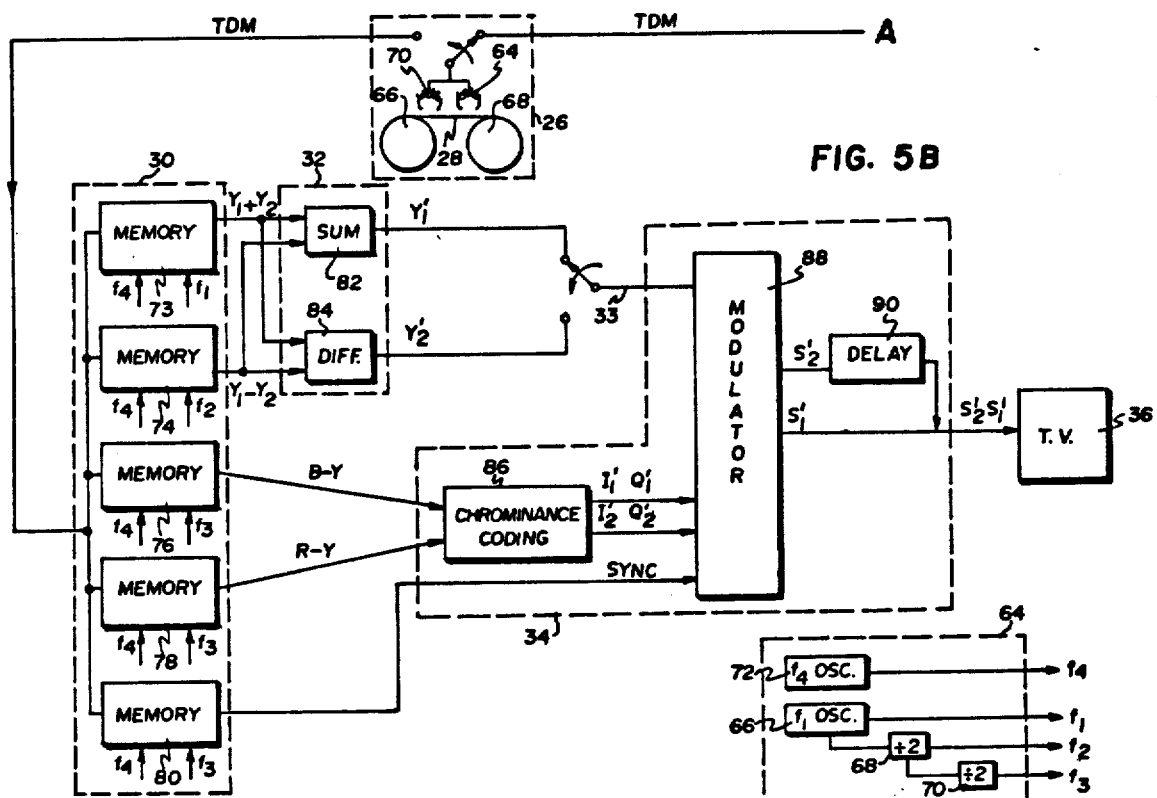

FIG. 5B